Dec. 3, 1963   C. G. CARDWELL   3,112,963
SHAFT HANGER BEARING
Filed Dec. 1, 1961   2 Sheets-Sheet 1

INVENTOR.
C.G. CARDWELL
BY *Young & Grigg*
ATTORNEYS

Dec. 3, 1963 C. G. CARDWELL 3,112,963
SHAFT HANGER BEARING

Filed Dec. 1, 1961 2 Sheets-Sheet 2

INVENTOR.
C.G. CARDWELL
BY *Young & Quigg*

ATTORNEYS

United States Patent Office 3,112,963
Patented Dec. 3, 1963

3,112,963
SHAFT HANGER BEARING
Charles G. Cardwell, Borger, Tex., assignor to Phillips Petroleum Company, a corporation of Delaware
Filed Dec. 1, 1961, Ser. No. 156,268
3 Claims. (Cl. 308—27)

This invention relates to a shaft hanger bearing having novel means for lubricating the same. Another aspect of said invention is a novel process of lubricating such a bearing.

One object of this invention is to reduce wear on the bearing and/or the shaft suspended in said bearing.

Another object is to provide a novel shaft hanger bearing suitable for long use in screw conveyor troughs in which hot carbon black particles are being conveyed, which is extremely hard service for a shaft hanger bearing.

Another object is to provide a shaft hanger bearing in which the lubricant is positively forced into the bearing below the shaft so that all parts of the shaft will be lubricated fully, and the shaft will be lifted up out of contact with the bearing by the lubricant entering the bearing below the shaft.

Numerous other objects and advantages will be apparent to those skilled in the art upon reading this specification and accompanying claims and drawings.

In the prior art of conveying hot carbon black particles by screw conveyors in carbon black manufacturing plants, frequent trouble has been experienced with the shaft hanger bearings in the hangers supporting the screw shafts in the hot flocculent carbon black particles. If the carbon black can enter the bearing it will act as an abrasive and cut the bearing surfaces badly. The bearings are continuously exposed to such possible entry of carbon black between their bearing surfaces. This tends to reduce bearing life and creates a great deal of repair and equipment shutdown time. When a bearing bushing is cut out by abrasion or melted out because of heat of friction, the bearing becomes exceedingly noisy. If it is not shut down immediately, damage to the shaft and to the other equipment attached thereto is certain in a very short time. However, it is quite difficult and expensive to shut down a carbon black plant, with its furnaces, pelleting mills, and other complicated equipment, much of which has to be purged with steam or inert gas under pressure in order to avoid the chance of an accidental explosion.

The present invention increases the life of bearings under such severe service conditions by a great amount. How much of an increase in life is achieved is not yet known, because bearings of this invention which have been placed in constant service in a carbon black plant have not yet burned out.

Figure 1:
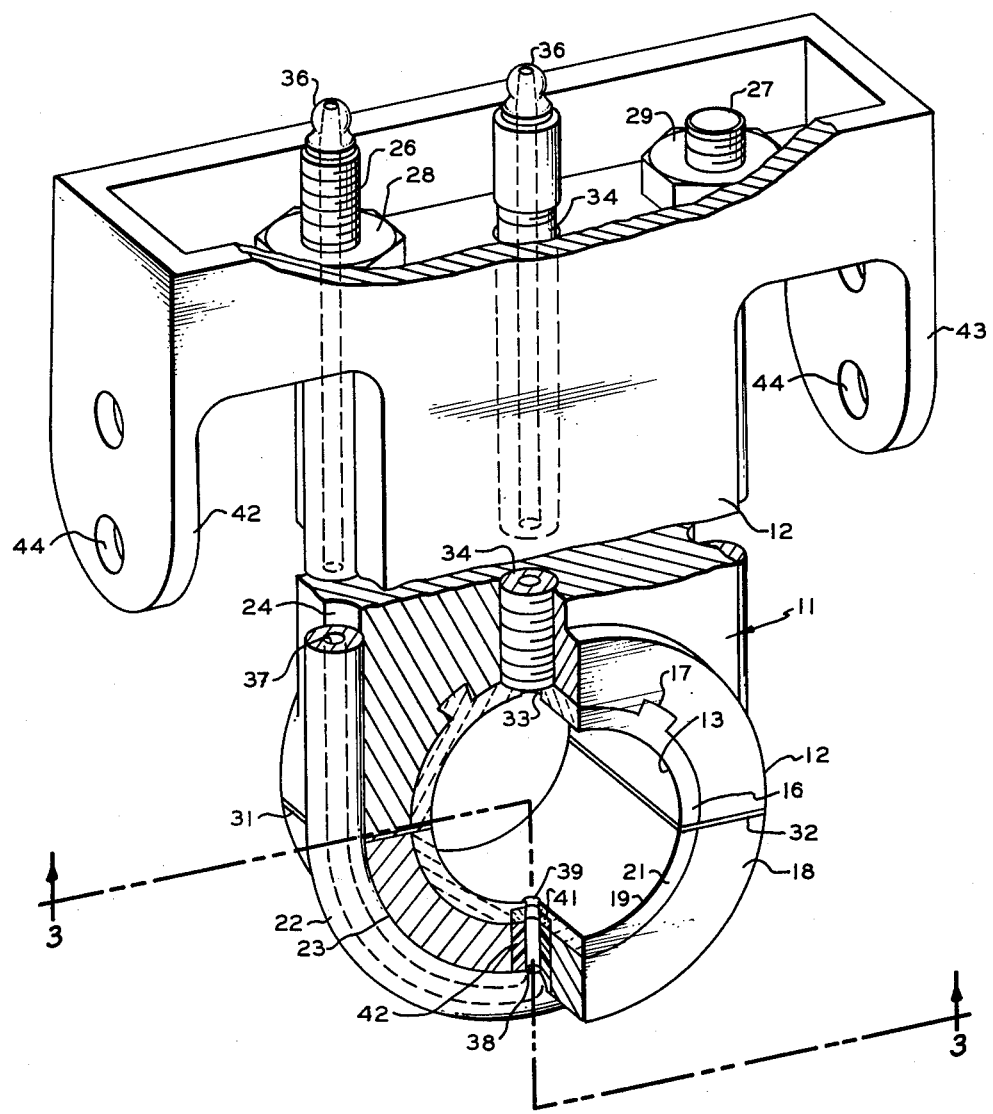
FIGURE 1 is an elevational view in perspective, with parts broken away to show details of construction, of a shaft hanger embodying the present invention.
Figure 2:
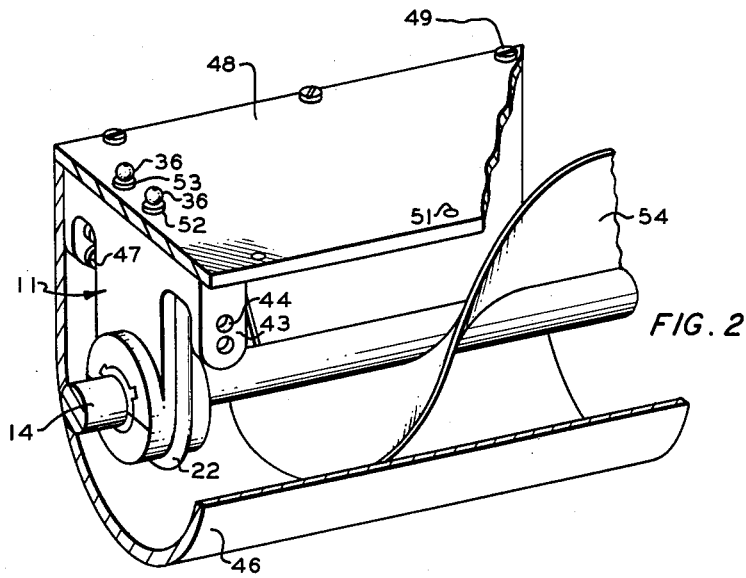
FIGURE 2 is an elevational view in perspective, with parts broken away to show details of construction, of a screw conveyor mounted in a carbon black-conveying trough by means of the shaft hanger of FIGURE 1.

In FIGURE 1 a shaft hanger, generally designated as 11, comprises in combination a hanger body or bearing base 12 which is provided with a semicylindrical groove 13 for receiving the upper shaft 14 of FIGURE 2. While semicylindrical groove 13 could be formed directly in the metal of base 12, it is preferred to have a lining sleeve 16 of another metal which has a lower coefficient of friction with the metal of shaft 14. If shaft 14 is steel, sleeve 16 may be brass or any antifriction alloy of metal, such as babbitt. When sleeve 16 is made of babbitt, it may be poured and cast in place, which is common practice in using babbitt for bearing surfaces. While the babbitt metal expands on cooling and solidifying into frictional contact with the base 12, a spline 17 may be provided to prevent rotation of sleeve 16 in base 12.

A bearing cap 18 is formed with a shaft receiving groove 19 therein similar to groove 13 and preferably similarly lined with a semicylindrical bearing metal sleeve 21 similar to sleeve 16. Said cap 18 and base 12 are disposed adjacent each other with said first and second grooves 13 and 19 disposed around shaft 14 to form a bearing for said shaft. Means are provided for securing cap 18 to base 12, comprising a yoke consisting of U-bolt 22 disposed in groove 23 in cap 18, groove 24 in base 12, the ends of which pass through holes in base 12 and are threaded at ends 26 and 27 to receive nuts 28 and 29. By tightening nuts 28 and 29, U-bolt 22 is forced to draw cap 18 up against body 12 so that grooves 13 and 19 closely fit shaft 14 and sleeves 16 and 21 act as a bearing for said shaft. If desired, one or more metal shims or gaskets 31 and 32 can be placed between body 12 and cap 18 to adjust the exact clearance of sleeves 16 and 21 around shaft 14.

Sleeve 16 may be provided with a lubricant conduit 33 in communication with a lubricant supply tube 34 formed in or secured to base 12. Lubricant tube 34 extends above the hanger body or base 12 and is provided with an inlet for lubricant, preferably a check valve containing grease fitting 36, shown in more detail in FIGURE 4.

Figure 4:
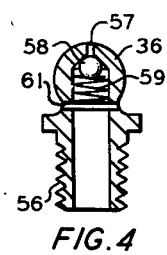
FIGURE 4 is a cross-sectional elevational view of one of the grease-fitting check valves shown in FIGURES 1 and 2.

The U-bolt 22 is also provided with a lubricant conduit 37 in one of its arms, having an inlet adjacent end 26. Said inlet is preferably controlled by a grease fitting 36 preferably containing a check valve, as shown in FIGURE 4. The outlet conduit 37 communicates at 38 with a lubricant conduit 39 in bearing sleeve 21 of cap 18. Disposed in conduit 39, it is preferred to have a spacing washer 41 made of metal, preferably the same metal as sleeve 21, and an elastic sealing tube 42 which is compressed between the bight of U-bolt 22 and sleeve 21 so as to seal around outlet 38 and passage 39 so that conduit 37 is in fluid-tight communication with conduit 39.

Sealing sleeve 42 is preferably made of natural rubber, or more preferably of a suitable synthetic rubber. Silicon rubber is preferred, being a synthetic material, the molecules of which are long chains of silicon-oxygen units with two methyl radicals attached to each silicon atom. Silicon rubber is noted for its retention of elasticity at temperatures as high as 570° F. and is not affected by oil, grease, combustion gases, carbon black or gases, vapors and solids present in the carbon black. Therefore, it has been found to be especially valuable in the practice of the present invention. Other plastic materials, such as polyethylene terephthalate and various heat-resistant neoprene rubbers may also be used for sleeve 42.

Washer 41 acts as a shim to compensate for differences in the length of sealing sleeve 42. For example, sleeve 42 may shorten some in service and then in overhauling the device a thicker washer can replace washer 41, thus restoring the sealing ability of sleeve 42. No washers are needed in lubricant passage 33 because tube 34 screws directly into body 12 and acts as its own seal.

The top of hanger body 12 may be provided with suitable depending ears 42 and 43 provided with bolt holes 44 or other conventional attaching means for securing it into position. The hanger body or base 12, 42 and 43 may be made integral, as shown, out of any suitable metal, such as gray cast iron, zinc or any suitable alloy.

The lubricant conduit 37 is preferably formed in U-bolt 22 while the bolt is straight and before it is bent into U shape. At that time, it may be formed by drilling a straight hole 37 connected to a short radial hole 38, both holes being drilled from the exterior of the bolt.

In FIGURE 2, the shaft hanger 11 of FIGURE 1 is shown mounted in a semicylindrical carbon black-conveying trough 46 by means of suitable rivets 47 securing the wall of trough 46 to ears 43, the rivets passing through holes 44. The top of trough 46 is preferably closed by a cover 48 preferably secured to trough 46 by screws 49 passing through holes 51 of the cover. Holes 52 and 53 are provided in cover 48 for the passage of grease inlet fittings 36.

Shaft 14 is supported for rotation in shaft hanger 11. Shaft 14 is provided with suitable propelling means, such as helical fin 54 which is securely fastened to shaft 14 and rotates with the same, driving the loose carbon black (not shown) from one end of trough 46 to the other.

Figure 3:
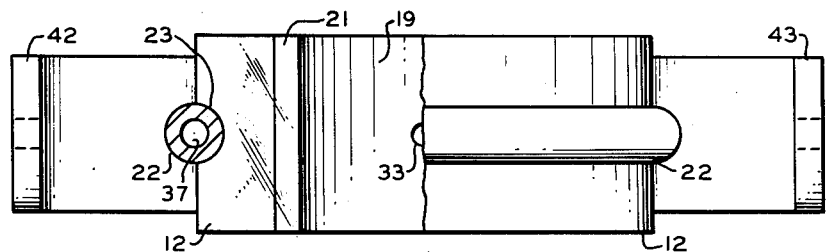
FIGURE 3 is a cross-sectional view of FIGURE 1 taken along the line 3—3 looking in the direction indicated by the arrows.

As FIGURE 3 is merely another view of FIGURE 1, no further description is believed necessary.

FIGURE 4 is a cross-sectional view through one of the preferred grease fittings 36, which is screw-threaded at 56 so that it may be secured to end 26 of U-bolt 22 or to pipe 34, both as shown in FIGURE 1. Fitting 36 has an inlet orifice 57 closed by a ball check valve 58. Ball 58 is biased to close orifice 57 by means of helical compression spring 59, which spring is held in place by pin 61.

While it is possible to use oil as the lubricant in the present invention, it is preferred to use grease.

While a specific type of shaft hanger has been shown in the drawings and described in the specification as the preferred embodiment of the present invention for purposes of illustration, the invention obviously is not limited thereto.

Having described my invention, I claim:

1. In a shaft hanger bearing supporting a shaft of an impeller of a conveyor conveying abrasive material, comprising a conveyor trough, a hanger base secured to the conveyor trough and extending down into said trough, said base having a first groove therein on its lower side, a first lubricant conduit extending through said base into communication with a portion of said first groove, a cap having a second groove therein on its upper side, said cap and base being disposed adjacent each other with said first and second grooves disposed around said shaft to form a supporting bearing for said shaft, and a yoke disposed with its central portion around and below said cap with its upper ends extending upward through holes in said base and secured to said base to support said cap and said shaft, the improvement comprising a second lubricant conduit extending through a lower portion of said cap into communication with a lower portion of said second groove, and a third lubricant conduit extending from an inlet opening in an upper end of said yoke through said yoke into communication with said second lubricant conduit, whereby lubricant injected in said inlet opening positively enters said second groove below said shaft thereby distributing lubricant where needed.

2. The combination of claim 1 including a valve in said third lubricant conduit disposed to be closed to retain the lubricant therein.

3. The combination of claim 2 in which said valve is a spring-biased back flow check valve disposed to pass lubricant down said third conduit to said second conduit and to check flow in the opposite direction.

References Cited in the file of this patent

UNITED STATES PATENTS

| | | |
|---|---|---|
| 132,395 | Gross | Oct. 22, 1872 |
| 701,636 | Smith et al. | June 3, 1902 |
| 1,319,425 | Critchlow | Oct. 21, 1917 |
| 1,985,709 | Zerk | Dec. 25, 1934 |
| 2,496,713 | Gray | Feb. 7, 1950 |